(12) United States Patent
Masuda et al.

(10) Patent No.: US 8,062,475 B2
(45) Date of Patent: Nov. 22, 2011

(54) METHOD FOR DETACHING PRESSURE-SENSITIVE ADHESIVE FILM

(75) Inventors: Tatsuya Masuda, Sagamihara (JP); Shingo Amari, Yamato (JP)

(73) Assignee: 3M Innovative Properties Company, St. Paul, MN (US)

( * ) Notice: Subject to any disclaimer, the term of this patent is extended or adjusted under 35 U.S.C. 154(b) by 172 days.

(21) Appl. No.: 12/376,451

(22) PCT Filed: Aug. 9, 2007

(86) PCT No.: PCT/US2007/075540
§ 371 (c)(1),
(2), (4) Date: Feb. 5, 2009

(87) PCT Pub. No.: WO2008/021923
PCT Pub. Date: Feb. 21, 2008

(65) Prior Publication Data
US 2010/0175829 A1    Jul. 15, 2010

(30) Foreign Application Priority Data
Aug. 14, 2006  (JP) .................................. 2006-221306

(51) Int. Cl.
*B32B 38/10* (2006.01)
(52) U.S. Cl. ....................................... 156/711; 156/752
(58) Field of Classification Search .................. 156/701, 156/711, 712, 752, 753; 428/40.1, 40.2, 428/40.3, 40.4, 40.5, 40.6, 40.7, 40.8, 40.9, 428/41.1, 41.2, 41.3, 41.4, 41.5, 41.6, 41.7, 428/41.8, 41.9, 42.1, 42.2, 42.3, 97, 343, 428/352, 354, 356
See application file for complete search history.

(56) References Cited

U.S. PATENT DOCUMENTS

| | | | |
|---|---|---|---|
| 6,764,569 B1 * | 7/2004 | Becher et al. | 156/272.2 |
| 2005/0072523 A1 * | 4/2005 | Businger et al. | 156/344 |
| 2006/0069201 A1 * | 3/2006 | Kondo et al. | 524/502 |
| 2006/0073754 A1 * | 4/2006 | Kawaguchi et al. | 442/151 |
| 2006/0125364 A1 | 6/2006 | Takeda et al. | |

FOREIGN PATENT DOCUMENTS

| | | |
|---|---|---|
| JP | 2001-316639 | 11/2001 |
| JP | 2002-294192 | 10/2002 |
| JP | 2004-069766 | 3/2004 |
| JP | 2004-309551 | 4/2004 |
| JP | 2005-091761 | 4/2005 |

* cited by examiner

*Primary Examiner* — Mark A Osele
*Assistant Examiner* — Nickolas Harm
(74) *Attorney, Agent, or Firm* — Dean M. Harts; Yen Tong Florczak; Ann Kulprathipanja

(57) ABSTRACT

To provide a detaching method capable of detaching a first substrate and a second substrate bonded together through a pressure-sensitive adhesive film, while minimizing the physical external load imposed on these substrates. A method for detaching a first substrate and a second substrate bonded together by a pressure-sensitive adhesive film comprising a pressure-sensitive adhesive polymer having dispersed therein a thermally decomposable metal hydroxide or metal salt hydrate filler, the method comprising a step of heating the pressure-sensitive adhesive film to a temperature capable of causing decomposition and dehydration of the metal hydroxide or metal salt hydrate, thereby accelerating the detachment.

8 Claims, 1 Drawing Sheet

METHOD FOR DETACHING PRESSURE-SENSITIVE ADHESIVE FILM

TECHNICAL FIELD

The present invention relates to a method for detaching a first substrate and a second substrate bonded together by a pressure-sensitive adhesive film.

BACKGROUND

Conventionally, a pressure-sensitive adhesive film has been used for bonding a first substrate, for example, a display panel such as plasma display panel, to a second substrate, for example, a chassis for disposing a display. At present, it is demanded that after a product comprising bonded substrates is used for a long time, the pressure-sensitive adhesive film is easily and clearly removed to separate the parts constituting each substrate. For example, a display panel and a chassis are separated by the following methods.

(1) The display panel and the chassis are detached by applying a physical external load, for example, by reducing the cohesive force of the pressure-sensitive adhesive under heating at around 200° C. or with use of an organic solvent and giving a twist.

(2) The display panel and the chassis are separated by inserting a wire, a thread or the like therebetween and cutting the pressure-sensitive adhesive film.

(3) The display panel and the chassis are separated by disposing pressure-sensitive adhesive pieces in the form of a long strip and withdrawing these from the side surface.

(4) Japanese Unexamined Patent Publication (Kokai) No. 2004-69766 and Japanese Patent Publication (Kokai) No. 2004-309551 disclose a display device where a display panel and a support plate are supported by a pressure-sensitive adhesive tape disposed therebetween and the pressure-sensitive adhesive tape can be pulled at its end part and thereby detached from the support plate.

In the case of the method (1), not a small load is imposed on the display panel and the chassis and this may cause breakage of the display or deformation of the chassis at the detachment. Also, there is a temporal restriction that the detaching operation must be performed within a time where reduction in the cohesive force due to heat or an organic solvent is effective. In the case of the method (2), when the adhesive has a high cohesive force and the resisting power is large, the pressure-sensitive adhesive film cannot be sometimes cut. In the methods (3) and (4), the film itself may be cut in the middle during the operation of removing the pressure-sensitive adhesive film, failing in successfully withdrawing the pressure-sensitive adhesive film. Furthermore, these methods have a problem such as failure in obtaining a stable effect due to change in the adhesive force with the lapse of time. In this way, on trying to detach a first substrate and a second substrate bonded together, when these substrates are a rigid substrate, the detachment is very difficult.

On the other hand, a pressure-sensitive adhesive film or sheet having also an ability of dissipating heat in an electronic device is known. Japanese Unexamined Patent Publication (Kokai) No. 2002-294192 discloses a thermally conducting flame-retardant pressure-sensitive adhesive comprising aluminum hydroxide as the flame retardant and aluminum oxide as the thermally conducting filler. However, how to detach the pressure-sensitive adhesive sheet after using such an adhesive as the thermally conducting pressure-sensitive adhesive sheet is not disclosed.

SUMMARY

Accordingly, an object of the present invention is to provide a detaching method capable of detaching a first substrate and a second substrate bonded together through a pressure-sensitive adhesive film, while minimizing the physical external load imposed on these substrates.

DETAILED DESCRIPTION OF THE PREFERRED EMBODIMENTS

Figure 1:
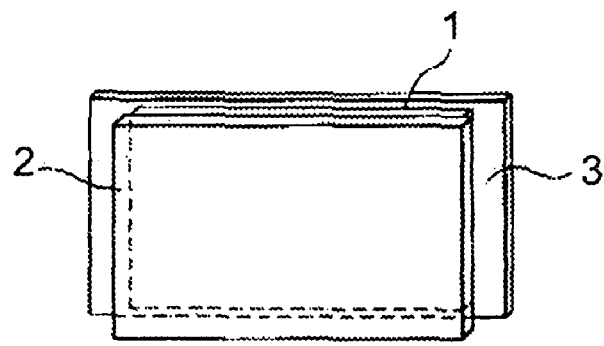
FIG. 1 A perspective view of the test unit in Examples.

The present invention includes the following embodiments.

(1) A method for detaching a first substrate and a second substrate bonded together by a pressure-sensitive adhesive film comprising a pressure-sensitive adhesive polymer having dispersed therein a thermally decomposable metal hydroxide or metal salt hydrate filler, the method comprising:
a step of heating the pressure-sensitive adhesive film to a temperature capable of causing decomposition and dehydration of the metal hydroxide or metal salt hydrate, thereby accelerating the detachment.

(2) The method as described in (1) above, wherein the first and second substrates are rigid substrates.

(3) The method as described in (2) above, wherein the first substrate is a display panel and the second substrate is a chassis for disposing a display.

(4) The method as described in any one of (1) to (3) above, wherein the thermally decomposable metal hydroxide or metal salt hydrate filler is selected from the group consisting of aluminum hydroxide, magnesium hydroxide, dawsonite, calcium aluminate hydrate, gypsum dihydrate and zinc borate hydrate.

(5) The method as described in any one of (1) to (4) above, wherein the thermally decomposable metal hydroxide or metal salt hydrate filler is contained in an amount of 20 to 70 mass % based on the mass of the pressure-sensitive adhesive.

(6) The method as described in any one of (1) to (5) above, wherein the pressure-sensitive adhesive polymer is selected from the group consisting of a (meth)acrylic polymer, a polyester, a polyurethane, a silicone resin, a polyether, a polycarbonate, a polyvinyl ether, a polyvinyl chloride, a polyvinyl acetate, a vinyl ester-based polymer, a polyisobutylene, a polystyrene, a polybutadiene, a polyisoprene and a polyacrylonitrile.

(7) The method as described in (6) above, wherein the pressure-sensitive adhesive polymer is a (meth)acrylic polymer.

(8) The method as described in any one of (1) to (7) above, wherein the thermally decomposable metal hydroxide is aluminum hydroxide and the pressure-sensitive adhesive film is heated to a temperature of 250° C. or more.

In the present invention, the term "(meth)acrylic" means acrylic or methacrylic.

According to the method of the present invention, the pressure-sensitive adhesive film is heated to a temperature not lower than the dehydration decomposition reaction temperature of the metal hydroxide or metal salt hydrate. As a result, the metal hydroxide or metal salt hydrate is decomposed and water vapor is generated, whereby detachment of the pressure-sensitive adhesive film is accelerated.

The present invention is described below based on its preferred embodiments, but the present invention should not be construed as being limited to these specific embodiments.

In one embodiment, the present invention is a method for detaching a first substrate and a second substrate bonded together by a pressure-sensitive adhesive film comprising a pressure-sensitive adhesive polymer having dispersed therein a thermally decomposable metal hydroxide or metal salt hydrate filler, the method comprising:

a step of heating the pressure-sensitive adhesive film to a temperature of causing decomposition and dehydration of the metal hydroxide or metal salt hydrate, thereby accelerating the detachment.

The method of the present invention is advantageous particularly when the first substrate and the second substrate are rigid substrates. This is because when the substrates are flexible, the pressure-sensitive adhesive film can be detached by bowing the substrates themselves and even without using the method of the present invention, the pressure-sensitive adhesive can be relatively easily detached, whereas when the substrates are rigid, the detachment of the pressure-sensitive adhesive film is difficult and the usefulness of the present invention increases.

The pressure-sensitive adhesive film comprises a pressure-sensitive adhesive polymer and a thermally decomposable metal hydroxide or metal salt hydrate filler. The pressure-sensitive adhesive polymer is not limited as long as an adhesive strength for bonding together a first substrate (for example, a display panel) and a second substrate (for example, a chassis) can be imparted to the pressure sensitive adhesive film and the polymer can withstand the use conditions and detaching operation conditions of the product containing the substrates. The pressure-sensitive adhesive polymer may be, for example, a (meth)acrylic polymer, a polyester, a polyurethane, a silicone resin, a polyether, a polycarbonate, a polyvinyl ether, a polyvinyl chloride, a polyvinyl acetate, a vinyl ester-based polymer, a polyisobutylene, a polystyrene, a polybutadiene, a polyisoprene or a polyacrylonitrile. Two or more species of these polymers may be used in combination. In view of weather resistance and adherence in use or heat resistance high enough to endure the heating at the detaching operation, the pressure-sensitive adhesive polymer is preferably a (meth)acrylic polymer.

The (meth)acrylic polymer which is a preferred pressure-sensitive adhesive polymer is described below. The (meth)acrylic polymer used is not particularly limited, and those conventionally used for the pressure-sensitive adhesive can be used. Examples of such (meth)acrylic polymers include copolymers of one or more alkyl acrylate ester and/or alkyl methacrylate ester (hereinafter sometimes referred to as an "alkyl (meth)acrylate ester") monomer having from 1 to 12 carbon atoms in the alkyl group and a polar monomer copolymerizable with that monomer.

Examples of the alkyl (meth)acrylate ester monomer include butyl (meth)acrylate, hexyl (meth)acrylate, n-octyl (meth)acrylate, isooctyl (meth)acrylate, 2-ethylhexyl (meth)acrylate and isononyl (meth)acrylate. Such a monomer acts to impart tackiness to the obtained pressure-sensitive adhesive. Examples of the polar monomer copolymerizable with the alkyl (meth)acrylate ester monomer include a carboxyl group-containing monomer such as (meth)acrylic acid, maleic acid and fumaric acid, and a nitrogen-containing monomer such as acrylamide, N-vinylpyrrolidone and N-vinylcaprolactam. Such a polar monomer acts to enhance the cohesive force and adhesive force of the pressure-sensitive adhesive. The ratio of the polar monomer to the alkyl (meth)acrylate ester monomer is not limited but is generally from 1 to 20 parts by mass per 100 parts by mass of the alkyl (meth)acrylate ester monomer.

The (meth)acrylic polymer for use in the pressure-sensitive adhesive may be crosslinked, if desired. The crosslinking is usually used in an amount of about 0.05 to 1 mass % based on the total mass of the monomers used and within this range, the shear adhesion of the pressure-sensitive adhesive can be enhanced. Examples of the crosslinking agent which can be used include a crosslinking monomer such as polyfunctional acrylate, e.g., 1,6-hexanediol diacrylate, timethylolpropane triacrylate, pentaerythritol tetraacrylate, 1,2-ethylene glycol diacrylate, 1,12-dodecanediol diacrylate. Other examples of the crosslinking agent include a substituted triazine such as 2,4-bis(trichloromethyl)-6-p-methoxystyrene-5-triazine, and a monoethylenic unsaturated aromatic ketone such as 4-acryloxybenzophenone.

The (meth)acrylic polymer for the pressure-sensitive adhesive is usually obtained by polymerizing the above-described monomers according to a normal radical polymerization method such as solution polymerization, emulsion polymerization, suspension polymerization or bulk polymerization. The polymerization is preferably performed by a photopolymerization method in the presence of an appropriate polymerization initiator. The (meth)acrylic polymer for use in the present invention may be more preferably obtained by irradiating ultraviolet rays (UV) or the like on those monomers, thereby effecting polymerization. Suitable examples of the polymerization initiator include a benzoin ether such as benzoin methyl ether and benzoin isopropyl ether, a substituted benzoin ether such as anisole methyl ether, a substituted acetophenone, 2,2-diethoxyacetophenone and 2,2-dimethoxy-2-phenylacetophenone. The polymerization initiator is preferably used in an amount of generally from 0.01 to 5 parts by mass per 100 parts by mass of the monomer mixture.

In the photopolymerization by ultraviolet rays (UV) or the like, a monomer mixture from which the dissolved oxygen is removed in an inert gas atmosphere such as nitrogen is coated on a support working out to a carrier, together with an appropriate photoinitiator and, if desired, a crosslinking agent, and ultraviolet rays are irradiated thereon, whereby the polymerization can be effected. In order to obtain good coatability on a support, it is advantageous to preliminarily polymerize the monomers with ultraviolet rays until a viscous liquid (syrup) having an appropriate viscosity is formed, and after coating the syrup on a support, complete the polymerization by further irradiating ultraviolet rays.

The pressure-sensitive adhesive film for use in the present invention comprises a metal hydroxide or metal salt hydrate filler capable of causing dehydration decomposition under heating. The metal hydroxide or metal salt hydrate filler is not limited as long as the effect of the present invention, that is, water vapor is generated resulting from dehydration decomposition at the heating and thereby the detachment of the pressure-sensitive adhesive film is facilitated, can be brought out. The metal hydroxide or metal salt hydrate filler is preferably aluminum hydroxide ($Al(OH)_3$), magnesium hydroxide ($Mg(OH)_2$), dawsonite ($NaAl(CO_3)(OH)_2$), calcium aluminate hydrate ($3CaO.Al_2O_3.6H_2O$), gypsum dihydrate ($CaSO_4.2H_2O$) or zinc borate hydrate ($2ZnO.3B_2O_3.3.5H_2O$). The gypsum dihydrate has a thermal decomposition temperature of 150° C. and therefore, this may be unsuitable for usage where the product containing bonded substrates is heated during use, such as plasma display, however, in the case of usage involving no elevation of the temperature during use, by virtue of occurrence of a dehydration decomposition reaction at a relatively low temperature, the pressure-sensitive adhesive polymer and the like contained in the pressure-sensitive adhesive can be prevented from decomposition at the heating operation for the detachment. On the other hand, magnesium hydroxide and zinc borate hydrate have a decomposition temperature exceeding 300° C., and care should be taken not to cause decomposition of components such as pressure-sensitive adhesive. Aluminum hydroxide, dawsonite and calcium aluminate hydrate have an appropriate thermal decomposition temperature of 200 to 350° C. and are preferred, and aluminum hydroxide is most preferred, because this has good thermal conductivity and flame retardancy and is available at a low cost.

The particle diameter of the metal hydroxide or metal salt hydrate filler is not limited but is preferably from 1 to 120 µm. If the particle diameter is less than 1 µm, a problem of increase in the viscosity may arise at the preparation of the pressure-sensitive adhesive, making it difficult to form a film, whereas if the particle diameter exceeds 120 µm, smoothness on the film surface may be lost and the adhesive force of the pressure-sensitive adhesive film may be inhibited. The particle diameter as used herein means an average particle diameter. The metal hydroxide or metal salt hydrate filler is contained in an amount of 20 to 70 mass % based on the mass of the pressure-sensitive adhesive. If the amount of the metal hydroxide or metal salt hydrate filler is too small, easy detachability of the pressure-sensitive adhesive film under heating may not be attained, whereas if it is excessively large, the adherence of the pressure-sensitive adhesive film may be inhibited.

The pressure-sensitive adhesive film for use in the present invention may further contain a thermally conducting filler in addition to the metal hydroxide or metal salt hydrate filler. This additional thermally conducting filler when used in combination with the metal hydroxide filler can synergistically enhance the thermal conductivity of the pressure-sensitive adhesive film. Such a thermally conducting filler preferably has a particle diameter of 50 to 120 µm. The metal hydroxide or metal salt hydrate filler having a small particle diameter is present to fill the gap between thermally conducting filler particles having a large particle diameter, whereby efficient heat transmission by the thermally conducting filler can be promoted. Examples of the thermally conducting filler include aluminum oxide, boron nitride and aluminum nitride.

The metal hydroxide or metal salt hydrate filler and the optional thermally conducting filler are blended at an appropriate time before or during the production of the (meth) acrylic polymer so as to be well dispersed in the pressure-sensitive adhesive. For example, in the ultraviolet polymerization, the monomers are preliminarily polymerized by the irradiation with a fixed amount of ultraviolet rays until formation of a syrup having an appropriate viscosity, the above-described fillers are introduced into the syrup, followed by stirring, and ultraviolet rays are further irradiated to complete the polymerization, whereby the fillers can be successfully dispersed in the pressure-sensitive adhesive.

The blending amount of the additional thermally conducting filler varies depending on the required heat conductivity but is usually 40 mass % or less based on the mass of the pressure-sensitive adhesive. The total amount of the metal hydroxide or metal salt hydrate filler and the thermally conducting filler is preferably from 20 to 80 mass %. If the total amount exceeds this range, the flowability of the viscous liquid before the completion of polymerization may be lost, making it difficult to prepare a pressure-sensitive adhesive film, or the obtained pressure-sensitive adhesive may be reduced in wettability to an adherend to give an adverse effect on the adhesive performance. Also, if the total amount is less than the above-described range, this may make it difficult to achieve both easy detachability under heating and sufficiently high thermal conductivity.

The pressure-sensitive adhesive may contain additives such as colorants, antioxidant, stabilizer and viscosity regulator, as long as the effect of the present invention is not adversely affected.

The pressure-sensitive adhesive film for use in the present invention is shaped into a sheet-like form by any appropriate method. For example, when the (meth)acrylic polymer containing fillers is produced by solution polymerization, the solution is coated on a plastic film such as polyethylene terephthalate (PET) film subjected to a detaching treatment, and dried, and the solvent is then removed, whereby the film formation of the pressure-sensitive adhesive film is performed. In the case of bulk polymerization by the irradiation with ultraviolet rays, the syrup after preliminary polymerization is further irradiated with ultraviolet rays on a film the same as above to complete the polymerization, whereby the film formation is performed. The thickness of the film is not particularly limited but is usually from 50 µm to 3 mm.

The pressure-sensitive adhesive film for use in the present invention comprises a thermally decomposable metal hydroxide or metal salt hydrate filler and therefore, when heated to a temperature not lower than the thermal decomposition temperature of the metal hydroxide or metal salt hydrate filler, a dehydration reaction occurs. This dehydration reaction is an endothermic reaction and contributes to flame retardancy of the pressure-sensitive adhesive film. Although not intended to be bound to a specific theory, it is considered that the water vapor generated from the metal hydroxide or metal salt hydrate upon heating applies a stress of accelerating detachment at the interface between the pressure-sensitive adhesive film and the substrate, whereby the pressure-sensitive adhesive film is easily detached. Accordingly, easy detachability depends on the amount of the metal hydroxide or metal salt hydrate filler. As the amount of the metal hydroxide or metal salt hydrate filler is larger, the amount of water vapor generated resulting from thermal decomposition is larger, and the easy detachability of the pressure-sensitive adhesive film is more successfully exerted. However, if the amount of the metal hydroxide or metal salt hydrate filler is too large, the adherence of the pressure-sensitive adhesive film is sometimes inhibited. The amount of the metal hydroxide or metal salt hydrate filler is as described above.

In order to facilitate the detachment of the pressure-sensitive adhesive film, the pressure sensitive-adhesive film is heated to the thermal decomposition temperature of the metal hydroxide or metal salt hydrate filler. For example, in the case of aluminum hydroxide, it is known that boehmite transition partially occurs at about 245° C. to cause dehydration ($2Al(OH)_3 \rightarrow 2AlO.OH + 2H_2O$) and furthermore, dehydration of gibbsite ($2Al(OH)_3 \rightarrow \kappa\text{-}Al_2O_3 + 3H_2O$) occurs at about 320° C. Therefore, when the metal hydroxide filler contained in the pressure-sensitive film is aluminum hydroxide, easy detachability of the pressure-sensitive adhesive film is obtained by heating to about 245° C. or more. In this way, the minimum necessary temperature for heating is determined by the dehydration temperature of the metal oxide.

On the other hand, the upper limit temperature is determined depending on the heat resistance of the substrate and the pressure-sensitive adhesive film. For example, it is important that the heating involves substantially no decomposition of other components in the pressure-sensitive adhesive film, such as pressure-sensitive adhesive polymer. For example, a (meth)acrylic pressure-sensitive adhesive can withstand heating up to about 350° C. A silicone-based pressure-sensitive adhesive can be heated to a higher temperature, but use of this pressure-sensitive adhesive in an electronic device tends to be avoided, because when substrates bonded with the pressure-sensitive adhesive are used, a siloxane gas is generated.

In this way, in usage for bonding of a display panel such as plasma display and a chassis, it is preferred that the pressure-sensitive polymer contained in the pressure-sensitive adhesive film is a (meth)acrylic polymer and the metal hydroxide filler is aluminum hydroxide. When such a pressure-sensitive adhesive film is used, the display panel and the chassis can be easily separated by heating to a temperature of about 250° C. or more, for example, from 250 to 350° C. Accordingly, separation of a display panel and a chassis after passing of the life span of a display device and in turn, recycling are facilitated.

Incidentally, in the foregoing pages, the present invention is described by referring to a display panel and a chassis as the substrates bonded together by the pressure-sensitive adhesive film, but it should be understood that the substrate is not limited thereto and the pressure-sensitive adhesive film can be used for the application to other devices such as electronic device, or building materials.

EXAMPLES

The present invention is described in greater detail below by referring to Examples. In Examples, unless otherwise indicated, the "parts" and "percentage" are on the mass basis.

Example 1

1. Production of Pressure-Sensitive Adhesive Film

100 Parts of 2-ethylhexyl acrylate (produced by Nippon Shokubai Co., Ltd., Chuo-ku, Osaka) as the alkyl (meth)acrylate ester monomer and 0.04 parts of Irgacure 651 (2,2-dimethoxy-2-phenylacetophenone, produced by Ciba Specialty Chemicals, Minato-ku, Tokyo) as the photoinitiator were thoroughly mixed in a glass container and after displacing the dissolved oxygen with a nitrogen gas, irradiated with ultraviolet rays for several minutes by a low-pressure mercury lamp to effect partial polymerization, thereby obtaining a viscous liquid (syrup) having a viscosity of 1,500 cP. Subsequently, 3 parts of acrylic acid (produced by Mitsubishi Chemical Corp., Minato-ku, Tokyo) as the polar monomer, 0.08 parts of 1,6-hexanediol diacrylate (HDDA) (NK-Ester-A-HD (trade name), produced by Shin-Nakamura Chemical Co., Ltd., Wakayama-shi, Wakayama) as the crosslinking agent and an aluminum hydroxide having an average particle diameter of 30 μm ($Al(OH)_3$, B-303 (trade name), produced by Nippon Light Metal Co., Ltd., Shinagawa-ku, Tokyo) in an amount of giving a content of 20 mass % based on the mass of the obtained pressure-sensitive adhesive were added to 100 parts of the composition obtained above, and the resulting mixture was stirred until the system became uniform. This mixture was vacuum defoamed and coated to a thickness of 1 mm on a 50 μm-thick polyester film subjected to a detaching treatment and after laminating thereon another sheet of the same film as above so as to block oxygen which inhibits the polymerization, both surfaces were irradiated by a low-pressure mercury lamp for about 5 minutes to obtain a pressure-sensitive adhesive film.

2. Evaluation Test

Figure 2:
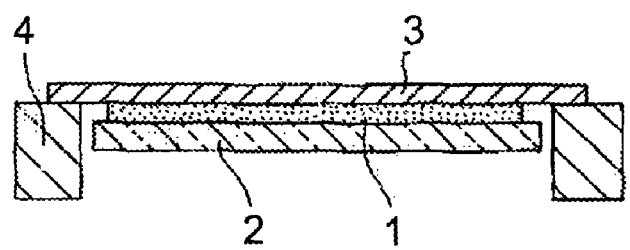
FIG. 2 A cross-sectional view showing how the test unit is placed in an oven in Examples.

A 200 mm×300 mm×3 mm float glass (415 g) (simulating a plasma display panel) and a 200 mm×330 mm×2 mm aluminum plate (simulating a chassis) were prepared as the first substrate and the second substrate, respectively, and these substrates were bonded together by using the pressure-sensitive adhesive film produced above having a dimension of 190 mm×290 mm. FIG. 1 is a perspective view showing the laminated test unit. In FIG. 1, reference numeral 1 indicates the pressure-sensitive adhesive film, 2 indicates the first substrate (float glass) and 3 indicates the second substrate (aluminum plate). In this way, six test units were produced. As shown in FIG. 2, each test unit was placed in an oven set to 150° C., 200° C., 250° C., 300° C., 350° C. or 400° C. by using a pedestal 4, and the time to detachment of the first substrate (float glass) 2 and the second substrate (aluminum plate) 3 was measured. The results are shown in Table 1.

Example 2

A pressure-sensitive adhesive film was produced and evaluated in the same manner as in Example 1 except that the amount of aluminum hydroxide was changed to give a content of 50 mass %. The results are shown in Table 1.

Example 3

A pressure-sensitive adhesive film was produced and evaluated in the same manner as in Example 1 except that the amount of aluminum hydroxide was changed to give a content of 70 mass %. The results are shown in Table 1.

Reference Example 1

A pressure-sensitive adhesive film was produced and evaluated in the same manner as in Example 1 except for not incorporating aluminum hydroxide at all. The results are shown in Table 1.

Reference Example 2

A pressure-sensitive adhesive film was produced in the same manner as in Example 1 except that the amount of aluminum hydroxide was changed to give a content of 10 mass %.

Reference Example 3

A pressure-sensitive adhesive film was produced in the same manner as in Example 1 except that the amount of aluminum hydroxide was changed to give a content of 80 mass %.

TABLE 1

| | | Amount of Aluminum Hydroxide in Pressure-Sensitive Adhesive Film (wt %) | | | | | |
|---|---|---|---|---|---|---|---|
| | | Reference Example 1 0 | Reference Example 2 10 | Example 1 20 | Example 2 50 | Example 3 70 | Reference Example 3 80 |
| Heating temperature | 150° C. | x | x | x | x | x | — |
| | 200° C. | x | x | x | x | x | — |

TABLE 1-continued

| | Amount of Aluminum Hydroxide in Pressure-Sensitive Adhesive Film (wt %) | | | | | |
|---|---|---|---|---|---|---|
| | Reference Example 1 0 | Reference Example 2 10 | Example 1 20 | Example 2 50 | Example 3 70 | Reference Example 3 80 |
| 250° C. | x | x | 30 | 28 | 22 | — |
| 300° C. | x | x | 27 | 13 | 5 | — |
| 350° C. | x | x | 22 | 11 | 5 | — |
| 400° C. | x | x | 16* | 6* | 5* | — |

(Description of Numerals and Symbols)
In the Table, the numeral denotes the time (unit: min) until the float glass and the aluminum plate were detached.
The mark x indicates that appropriate detachment was not obtained.
The mark — indicates that appropriate adhesive force as the jointing material was not obtained by the addition of aluminum hydroxide.
The mark * indicates that carbonization and filming of the jointing material were generated at the detaching.

As seen from the results above, when aluminum hydroxide is used as the metal hydroxide filler, in view of easy detachability at the heating and adhesive force of the pressure-sensitive film, the amount of the aluminum hydroxide added is suitably from 20 to 70 mass % and the heating temperature is suitably from 250 to 300° C. However, even when the amount is less than 20 mass %, the substrates can be easily detached by applying an external force, in addition to the self-weight of the substrate. Also, the heating temperature and the amount added may be appropriately determined depending on the kind of the metal hydroxide filler.

Example 4

A pressure-sensitive adhesive film was produced in the same manner as in Example 1 except that the amount of aluminum hydroxide added was changed to 46 mass % based on the mass of the pressure-sensitive adhesive film. Also, in the evaluation test, a practical glass panel for plasma display was used as the first substrate, and an aluminum chassis was used as the second substrate.

Glass panel: 42 inch-size, weight: 9 kg
Aluminum chassis: 42 inch-size, weight: 6 kg
Area of pressure-sensitive adhesive film: 0.42 m²

Figure 3:
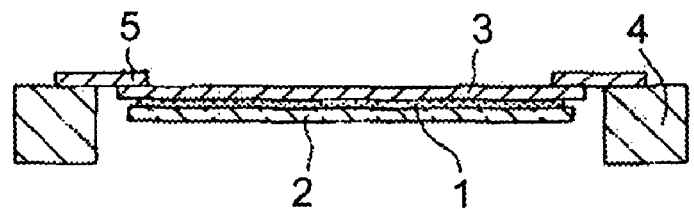
FIG. 3 A cross-sectional view showing how the test unit is placed in an oven in Examples.

As shown in FIG. 3, the test unit was placed in an oven at 300° C. by using a pedestal 4 with a hanging jig 5 and evaluated in the same manner as in Example 1. The results are shown in Table 2.

Example 5

A pressure-sensitive adhesive film was produced in the same manner as in Example 1 except that the amount of aluminum hydroxide added was changed to 60 mass % based on the mass of the pressure-sensitive adhesive film. Also, the evaluation test was performed in the same manner as in Example 4 except that two test units were used and tested in ovens at 250° C. and 300° C.

TABLE 2

| | Pressure-Sensitive Adhesive Film | Temperature of Oven | Separation of Glass Panel and Aluminum Chassis | Time to Separation | Damage of Glass Panel and Aluminum Chassis at Separation |
|---|---|---|---|---|---|
| Example 4 | containing 46 wt % of aluminum hydroxide | 300° C. | OK | 15 min. | none |
| Example 5 | containing 60 wt % of aluminum hydroxide | 250° C. | OK | 28 min. | none |
| | | 300° C. | OK | 11 min. | none |

In all conditions, the glass panel and the aluminum chassis could be detached only by the self-weight of the glass panel without causing a severe damage.

The invention claimed is:

1. A method for detaching a first substrate and a second substrate bonded together by a pressure-sensitive adhesive film comprising a pressure-sensitive adhesive polymer having dispersed therein a thermally decomposable metal hydroxide or metal salt hydrate filler, the method comprising:
    a step of heating said pressure-sensitive adhesive film to a temperature capable of causing decomposition and dehydration of the metal hydroxide or metal salt hydrate, thereby accelerating the detachment.

2. The method of claim 1, wherein said first and second substrates are rigid substrates.

3. The method of claim 2, wherein said first substrate is a display panel and said second substrate is a chassis for disposing a display.

4. The method of claim 1, wherein said thermally decomposable metal hydroxide or metal salt hydrate filler is selected from the group consisting of aluminum hydroxide, magnesium hydroxide, dawsonite, calcium aluminate hydrate, gypsum dihydrate and zinc borate hydrate.

5. The method of claim 1, wherein said thermally decomposable metal hydroxide or metal salt hydrate filler is contained in an amount of 20 to 70 mass % based on the mass of the pressure-sensitive adhesive.

6. The method of claim 1, wherein said pressure-sensitive adhesive polymer is selected from the group consisting of a (meth)acrylic polymer, a polyester, a polyurethane, a silicone resin, a polyether, a polycarbonate, a polyvinyl ether, a polyvinyl chloride, a polyvinyl acetate, a vinyl ester-based polymer, a polyisobutylene, a polystyrene, a polybutadiene, a polyisoprene and a polyacrylonitrile.

7. The method of claim 6, wherein said pressure-sensitive adhesive polymer is a (meth)acrylic polymer.

8. The method of claim 1, wherein said thermally decomposable metal hydroxide is aluminum hydroxide and the pressure-sensitive film is heated to a temperature of 250° C. or more.

\* \* \* \* \*